(12) United States Patent
Seth (10) Patent No.: US 11,900,047 B1
(45) Date of Patent: Feb. 13, 2024

(54) SYSTEMS, METHODS AND SOFTWARE FOR IMPROVING THE ENERGY FOOTPRINT OF AN ELECTRONIC DOCUMENT

(71) Applicant: Microsoft Technology Licensing, LLC, Redmond, WA (US)

(72) Inventor: Rolly Seth, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/156,667

(22) Filed: Jan. 19, 2023

(51) Int. Cl.
*G06F 40/166* (2020.01)
*G06F 3/0482* (2013.01)
*G06V 30/413* (2022.01)
*G06F 40/194* (2020.01)

(52) U.S. Cl.
CPC .......... *G06F 40/166* (2020.01); *G06F 3/0482* (2013.01); *G06F 40/194* (2020.01); *G06V 30/413* (2022.01)

(58) Field of Classification Search
None
See application file for complete search history.

(56) References Cited

U.S. PATENT DOCUMENTS

| 7,407,108 B1 * | 8/2008 | Euler | G06F 1/32 455/574 |
| 7,967,212 B1 * | 6/2011 | Euler | G06F 1/32 455/574 |
| 8,599,707 B2 * | 12/2013 | Garg | G06F 12/0802 370/332 |
| 11,073,887 B2 * | 7/2021 | Marchiori | G06F 1/3212 |
| 2009/0282327 A1 * | 11/2009 | Hamilton, II | G06F 16/9577 715/231 |
| 2010/0027051 A1 * | 2/2010 | Hamilton, II | G06F 3/1285 358/1.15 |
| 2010/0153176 A1 * | 6/2010 | Sussmeier | G06Q 10/08 705/406 |

(Continued)

OTHER PUBLICATIONS

Hussain, Asim, "How to Measure and Reduce the Carbon Footprint of your Application", Retrieved From: https://cloudblogs.microsoft.com/industry-blog/en-gb/technetuk/2021/10/12/how-to-measure-and-reduce-the-carbon-footprint-of-your-application/, Oct. 12, 2021, 9 Pages.

(Continued)

*Primary Examiner* — Asher D Kells (57) ABSTRACT

A computing apparatus comprising one or more computer readable storage media, one or more processors operatively coupled with the one or more computer readable storage media, and an application comprising program instructions stored on the one or more computer readable storage media that direct the computing apparatus to at least display electronic document in a user interface to an application and send a request to an energy analysis service to analyze an energy footprint of the electronic document, wherein the request identifies a characteristic of the electronic document. The program instructions further direct the computing apparatus to receive a reply to the request, wherein the reply includes a recommendation to decrease the energy footprint of the electronic document and modify the electronic document in accordance with the recommendation.

20 Claims, 8 Drawing Sheets

(56) References Cited

U.S. PATENT DOCUMENTS

| | | | |
|---|---|---|---|
| 2011/0072378 A1* | 3/2011 | Nurminen | G06F 9/5094 |
| | | | 715/771 |
| 2012/0260111 A1* | 10/2012 | Tarkoma | G06F 1/3203 |
| | | | 340/657 |
| 2012/0322387 A1* | 12/2012 | Nicoara | H04M 1/24 |
| | | | 455/67.11 |
| 2017/0149633 A1* | 5/2017 | Arulesan | G06F 11/3062 |
| 2017/0164290 A1* | 6/2017 | Arulesan | G06F 1/3212 |
| 2017/0242470 A1* | 8/2017 | Fu | G06F 1/3206 |
| 2023/0042767 A1* | 2/2023 | Bansal | G06F 16/954 |

OTHER PUBLICATIONS

Lagarde, Pierre, "Measuring the carbon impact of web browsing", Retrieved From: https://devblogs.microsoft.com/sustainable-software/measuring-the-carbon-impact-of-web-browsing/, Jun. 14, 2021, 6 Pages.

Brinkmann, Martin, "Windows 11 is soon giving you energy recommendations", Retrieved From: https://windows-11.en.softonic.com/articles/windows-11-energy-recommendations, Nov. 4, 2022, 10 Pages.

* cited by examiner

SYSTEMS, METHODS AND SOFTWARE FOR IMPROVING THE ENERGY FOOTPRINT OF AN ELECTRONIC DOCUMENT

TECHNICAL FIELD

Aspects of the disclosure are related to the field of computer software applications and services and, in particular, to managing the energy footprint of electronic document.

BACKGROUND

Software design, development, and deployment has an impact on energy consumption. Specifically, software runs on hardware, and hardware requires energy to operate. As software utilization increases, so too does the reliance on hardware, and in turn the energy utilization of said hardware. Attempts to reduce energy consumption of software tend to focus on building efficient software applications based on proposed changes to software design, development, and deployment as well as focusing on the backend processes need to provide instances of an application to a user.

Focusing on backend processes, design, development, and deployment ignores the end user, who also has an impact on the energy utilization of a software application. For example, the end user typically controls the type, quantity, and implementation of content in an electronic document. As a result, the end user has a direct impact on the energy footprint (i.e., an assessment of energy consumption) of the electronic document.

OVERVIEW

Technology disclosed herein includes a service that decreases the energy footprint of electronic documents and other such content, thereby reducing energy requirements of computational systems and wasteful computation overhead. In an implementation, a software application on a computing device directs the device to display an electronic document in a user interface to the software application, wherein the electronic document was generated by the software application in response to a user input to create the electronic document for editing, updating, collaborating, sharing presenting, and the like. The software application further directs the computing device to send a request to an energy analysis service to analyze an energy footprint of the electronic document, wherein the request identifies characteristic of the electronic document. The software application also directs the device to receive a reply to the request, wherein the reply includes a recommendation for decreasing the energy footprint of the electronic document. Finally, the software application directs the computing device to modify the electronic document in accordance with the recommendation.

In another implementation, a software application on a computing device directs the device to receive a request to analyze an energy footprint of electronic document in a user interface to an application, wherein the request identifies a characteristic of the electronic document. The software application further directs the device to identify the energy footprint of the electronic document and identify an alteration to the electronic document that decreases the energy footprint of the electronic document. Then, the software application directs the device to modify the electronic document in accordance with the alteration.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Technology disclosed herein is generally directed to increasing the energy efficiency of electronic documents by decreasing their energy footprint. The energy efficiency and moderation technology disclosed herein improves the computational energy required to at least edit, share, present, transmit, and store electronic documents as compared to existing technological solutions. Various implementations described herein employ an energy efficiency process on one or more computing devices that facilitate automatic or semi-automatic modifications to electronic documents. The energy efficiency process may be employed locally with respect to a user experience (e.g., on a user's device), remotely with respect to the user experience (e.g., on a server), or distributed between or amongst multiple devices.

In various implementations, such computing devices include one or more processors operatively coupled with one or more computer readable storage media. Program instructions stored on the one or more computer readable storage media that when executed by the one or more processors, direct a given computing device to carry out various steps with respect to a representative energy efficiency process. For example, a computing device may receive a request to generate an electronic document using features of a productivity application. The computing device may display the electronic document in a user interface to the productivity application and send a request to an energy analysis service to analyze an energy footprint of the electronic document, wherein the request identifies characteristic of the electronic document. The computing device may then receive a reply to the request, wherein the reply includes a recommendation to decrease the energy footprint of the electronic document. Finally, the computing device may then modify the electronic document in accordance with the recommendation.

In another example, the computing device may receive a request to analyze an energy footprint of electronic document generated using features of a productivity application and displayed in a user interface to the productivity application, wherein the request identifies a characteristic of the electronic document. The computing device may then identify the energy footprint of the electronic document and identify an alteration to the electronic document that decreases the energy footprint of the electronic document. Finally, the computing device may modify the electronic document in accordance with the alteration.

Various technical effects that result from increasing the energy efficiency of electronic documents as disclosed herein may be apparent. At a high level, the document may comprise a file size smaller than the original document, which reduces the energy footprint that corresponds to rendering, transmitting, and storing the document. Additionally, the present technology greatly reduces computational overhead by reducing or removing energy consuming elements of an electronic document (e.g., animations, external links, etc.). A reduction in file size and energy consuming elements may reduce demand on a global scale for the energy used to power a document generation and distribution service. At a more local level, a reduction in energy consuming elements consumes less battery power (e.g., on mobile devices) and draws less energy from local power grids (e.g., devices connected to a building's power supply).

Figure 1:
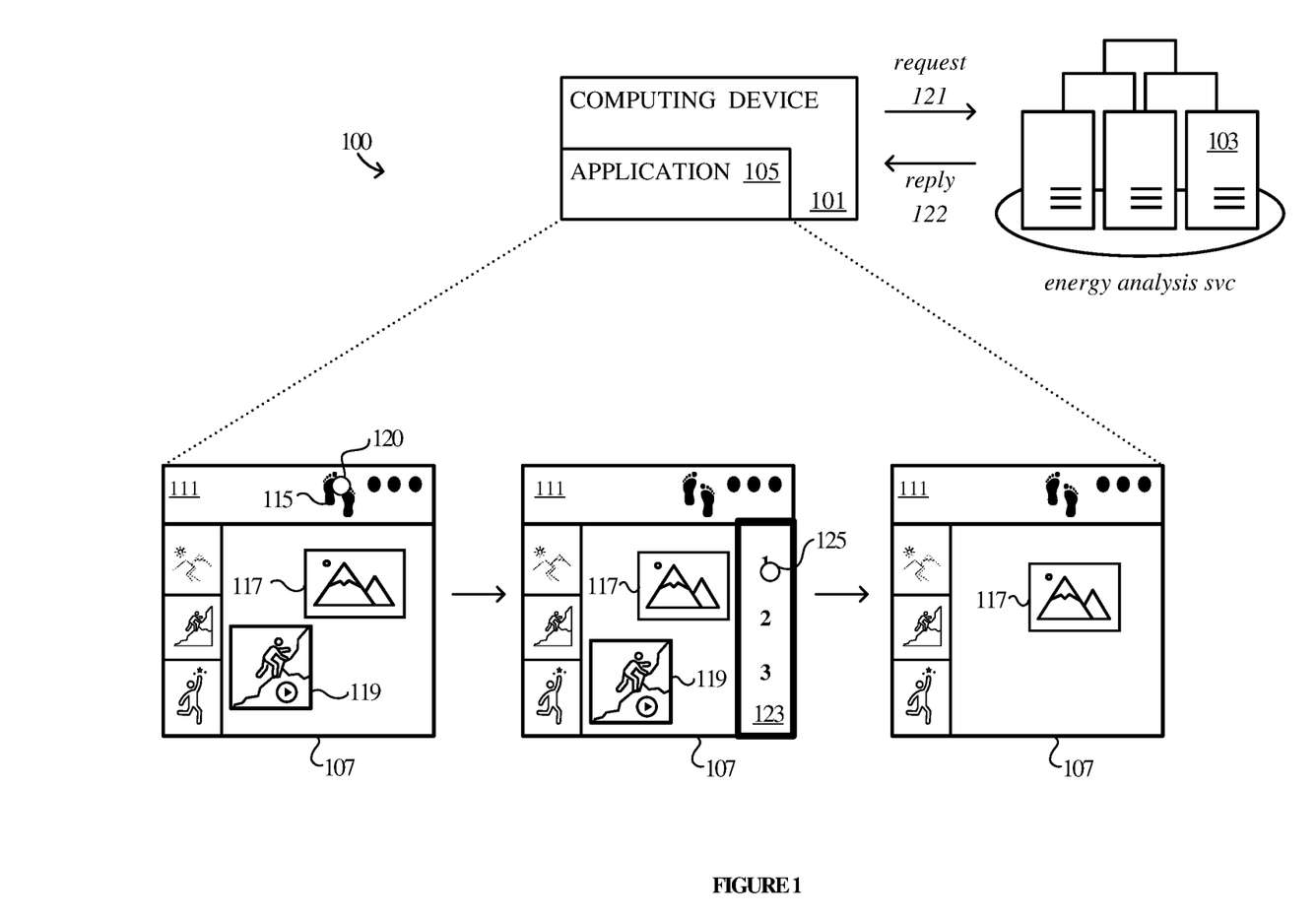
FIG. 1 illustrates an operational environment in an implementation.
Figure 7:
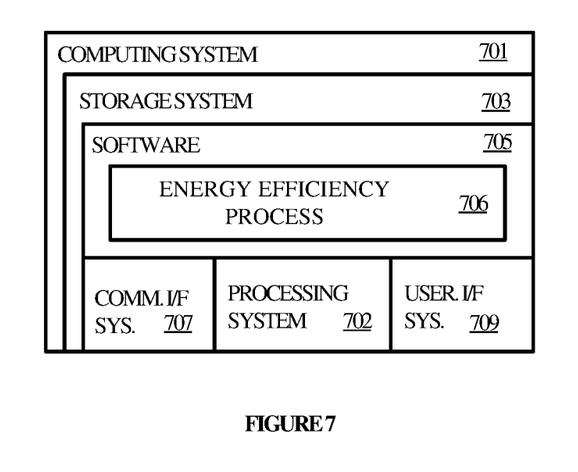
FIG. 7 illustrates a computing system suitable for implementing the various operational environments, architectures, processes, scenarios, and sequences discussed below with respect to the other Figures.

Turning to the figures, FIG. 1 illustrates an operational environment 100 in an implementation. Operational environment 100 includes computing device 101 and online service 103. Computing device 101 includes one or more software applications (e.g., application 105) capable of employing an energy efficiency process with respect to a document (e.g., document 107). Computing device 101 may also be capable of driving a user experience including by displaying a user interface to the application (e.g., user interface 111), receiving user input via the user interface, and responding to the user input per the energy efficiency process. Examples of computing device 101 include personal computers, tablet computers, mobile phones, wearable devices, and any other suitable devices, of which computing device 701 in FIG. 7 is broadly representative. Example applications include productivity applications such as a presentation application, a word processing application, a spreadsheet application, and the like. The application may be a natively installed and executed application, a browser-based application, or a mobile application, and may execute in a stand-alone manner, within the context of another application, or in some other manner entirely. It may be appreciated that some of the features and functionality attributed to the application on computing device 101 may be performed by online service 103 in some implementations.

Online service 103 provides one or more computing services to end points such as computing device 101, including an energy analysis service. The energy analysis service provided by online service 103 receives a request comprising characteristics of electronic document as an input and produces a recommendation selectable to modify the electronic document. The energy analysis service may also modify, automatically, the electronic document thereby improving the energy efficiency of the electronic document. Online service 103 may optionally provide a suite of applications and services with respect to a variety of computing workloads such as social sharing, office productivity tasks, email, chat, voice and video, and so on.

Figure 2:
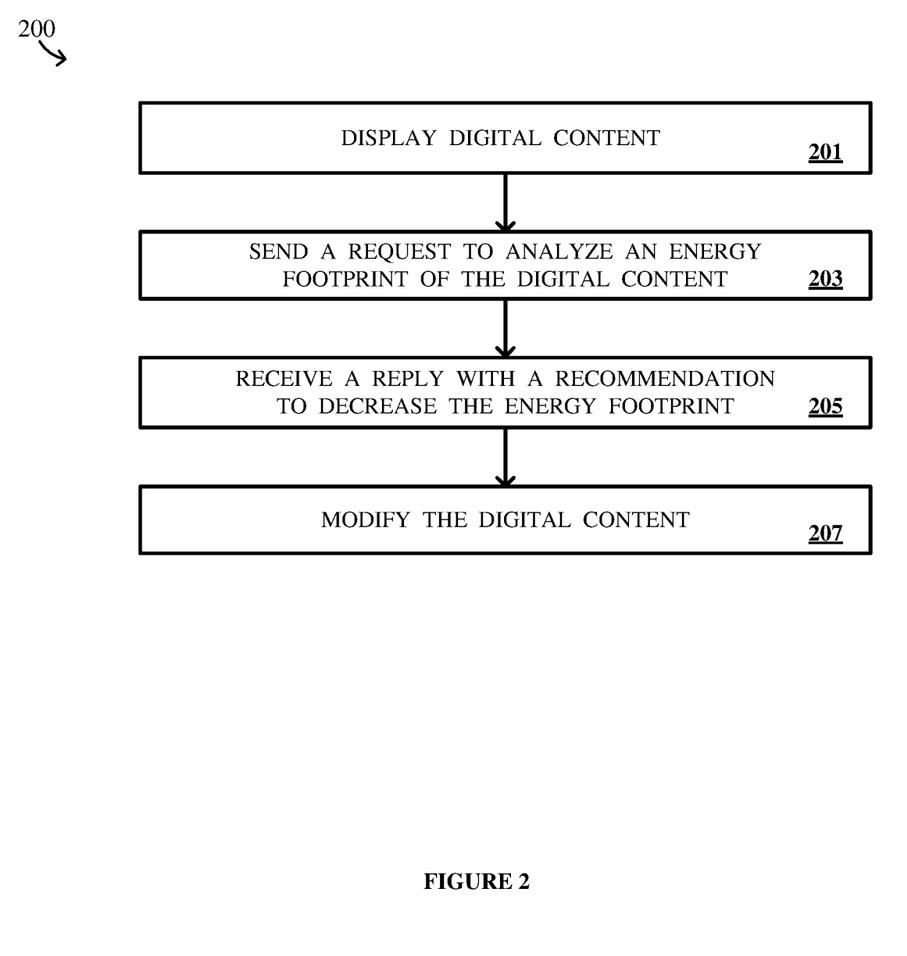
FIG. 2 illustrates an energy efficiency process in an implementation.

Online service 103 employs one or more server computers co-located or distributed across one or more data centers connected to or otherwise in communication with computing device 101. Examples of such servers include web servers, application servers, virtual or physical (bare metal) servers, or any combination or variation thereof, of which computing device 701 in FIG. 7 is broadly representative. Computing device 101 may communicate with online service 103 via one or more internets and intranets, the Internet, wired and wireless networks, local area networks (LANs), wide area networks (WANs), and any other type of network or combination thereof As mentioned, computing device 101 employs an energy efficiency process that improves the energy footprint of electronic documents, of which energy efficiency process 200 in FIG. 2 is representative. Energy efficiency process 200 may be implemented in program instructions in the context of any of the software applications, modules, components, or other such elements of one or more computing devices. The program instructions direct the one or more computing devices to operate as follows, referring to a computing device in the singular for the sake of clarity.

In operation, a computing device employing energy efficiency process 200 displays an electronic document in a user interface to an application (step 201). The electronic document may be created in response to a user input requesting an application generate the electronic document in a format that may be edited, updated, presented, shared, and the like. The electronic document includes feature elements specified by the user such as images, videos, text, links to external content, enabled application features (e.g., zoom, animation, transition, etc.), and the like.

The computing device may then send a request to an energy analysis service to analyze an energy footprint of the electronic document (step 203). For example, the computing device may generate a request identifying all or a portion of the feature elements of the electronic document. The computing device may also characterize the electronic document (e.g., tagging content; grouping content similar in type; identifying a presence of an embedded video overlapping images, a hidden image, external link, enabled application feature, and the like; etc.) and generate the request to include at least one characteristic of the electronic document.

Next, the computing device receives a reply to the request, wherein the reply includes a recommendation to decrease the energy footprint of the electronic document (step 205). For example, the computing device may receive the reply from an energy analysis service that identified one or more actions for reducing the energy footprint of the document. The computing device may also generate a user interface for surfacing the recommendation and through which a user may elect to modify the electronic document according to the recommendation. Alternatively, the recommendation may be executed automatically (e.g., responsive to receiving the reply containing a recommendation to modify the electronic document), and the computer may generate a user interface for surfacing a description of the modification to the electronic document, which may include a selectable option for undoing the modification.

Finally, the computing device (subject to energy efficiency process 200) modifies the electronic document in accordance with the recommendation (step 207). For example, the computing device may surface a user interface selectable to execute the recommendation, and responsive to receiving a user input comprising a selection of the recommendation, automatically modify the electronic document in accordance with the recommendation. Alternatively, the computing device may automatically execute the recommendation responsive to receiving the reply containing a recommendation to modify the electronic document.

Referring back to FIG. 1, the following describes an application of energy efficiency process 200 with respect to the elements of operational environment 100. In operation, computing device 101, via application 105, employs an energy efficiency process to direct computing device 101 to display in user interface 111 the electronic document of document 107. User interface 111 includes efficiency icon 115, feature element 117 (e.g., an image), and feature element 119 (e.g., a video). Responsive to user input 120 selecting efficiency icon 115, computing device 101 transmits request 121 to online service 103 to analyze the energy footprint of feature elements 117 and 119. Request 121 includes a characteristic of feature elements 117 and 119.

Subsequent to analyzing the energy footprint of feature elements 117 and 119, online service 103 transmits reply 122 to computing device 101. Reply 122 may include recommendations for reducing the energy footprint of feature elements 117 and 119.

Responsive to receiving reply 122, computing device 101 surfaces user interface 123, which includes three recommended alterations. The alterations may include one or more of the following suggestions: removal of video content, removal of an image, disabling an enabled application feature (not shown), deactivating an external link (not shown), etc. Though three recommended alterations are shown, it is contemplated herein that user interface 123 may comprise less than three and more than three recommended alterations.

Responsive to user input 125, computing device 101 removes feature element 119 from document 107, thereby reducing the energy footprint of document 107. Though user interface 123 is shown as an embedded element of user interface 111, it is contemplated herein that user interface 123 may be surfaced as a pop-up window, call-out box, separate window, and the like.

Figure 3:
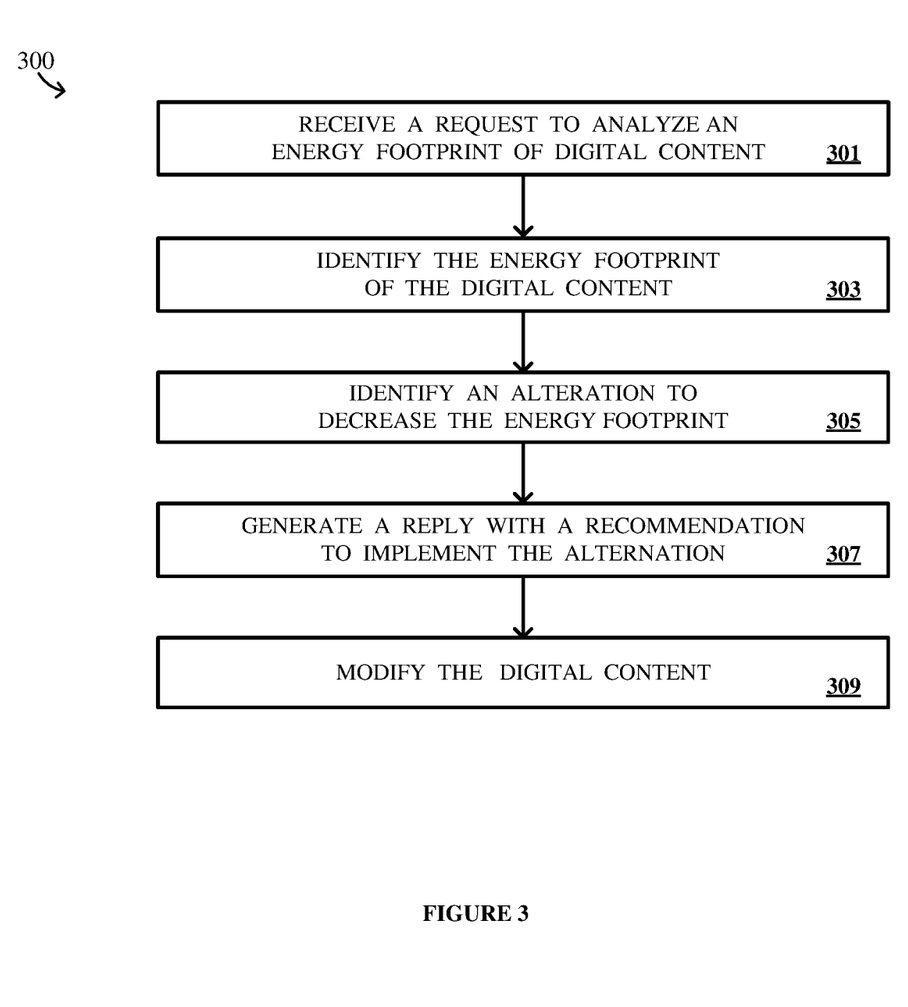
FIG. 3 illustrates an energy moderation process in an implementation.
Figure 4:
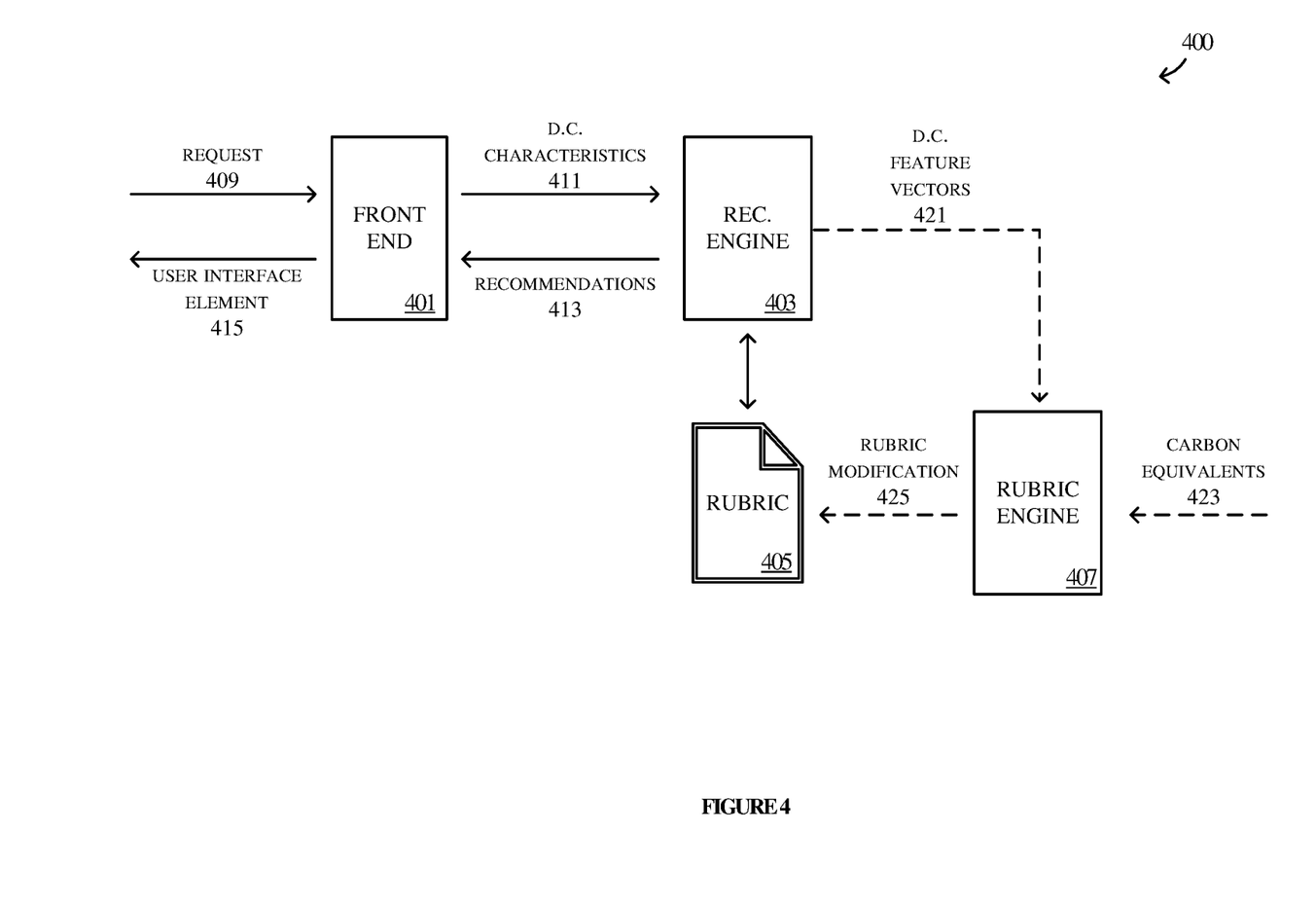
FIG. 4 illustrates an operational architecture in an implementation.

FIG. 3 illustrates energy moderation process 300, and FIG. 4 illustrates operational architecture 400 in an implementation for providing the energy efficiency capabilities disclosed herein. Energy moderation process 300 may be implemented in program instructions in the context of any of the software applications, modules, components, or other such elements of one or more computing devices. The program instructions direct the one or more computing devices to operate as follows, referring to a computing device in the singular for the sake of clarity. The steps of energy moderation process 300 will be discussed parenthetically in the context of the discussion of FIG. 4. Operational architecture 400 may be employed by online service 103 and includes front end 401, recommendation engine 403, rubric 405, and rubric engine 407.

In an embodiment, front end 401 is representative of any component(s) capable of receiving a request to analyze an energy footprint of an electronic document and producing characteristics of the electronic document. Recommendation engine 403 is representative of any component(s) capable of receiving characteristics of electronic document and producing a reply that includes a recommendation to implement an alteration to the electronic document as well as feature vectors of the electronic document characteristics. Rubric 405 is representative of any component(s) capable of receiving rubric modifications and producing criteria for calculating energy footprints of electronic document, criteria for identifying alterations and modifications that will decrease the energy footprint of electronic document, and the like. Rubric engine 407 is representative of any component(s) capable of receiving feature vectors of digital characteristics and carbon equivalents and producing rubric modifications.

In operation, front end 401 receives request 409 (step 301) and generates electronic document characteristics 411. Request 409 includes a request to analyze an energy footprint of electronic document in a user interface to an application. Electronic document characteristics 411 may include quantities, tags, groupings, etc. of the electronic document in the user interface to the application as well as descriptions that identify a presence of embedded video, overlapping images, hidden images, external links, enabled applications, and the like. Front end 401 then transmits electronic document characteristics 411 to recommendation engine 403 and receives a reply with recommendations 413. Responsive to receiving the reply, front end 401 generates user interface element 415 comprising at least a description of recommendations 413 and transmits user interface element 415 to a client computing device (not shown).

Recommendation engine 403 receives electronic document characteristics 411 and rubric 405 and produces recommendations 413 and electronic document feature vectors 421. To produce recommendations 413, recommendation engine 403 may identify the energy footprint of the electronic document (step 303). For example, recommendation engine 403 may refer to rubric 405 to determine an energy consumption corresponding to a characteristic of the electronic document characteristics 411 using a criterion of rubric 405 for calculating energy footprints of electronic document. Alternatively, recommendation engine 403 may calculate the energy consumption of the electronic document based on a machine learning process that analyzes the energy utilization of electronic document based on characteristics of the electronic document.

To produce recommendations 413, recommendation engine 403 may also identify an alteration to the electronic document that would decrease the energy footprint of the electronic document (step 305). For example, recommendation engine 403 may refer to rubric 405 to identify an alteration to the electronic document that will decrease the energy footprint of the electronic document based on a criterion of rubric 405 for alterations that increase energy efficiencies of electronic document.

Recommendation engine 403 then generates a reply that includes recommendations 413 (step 307), which suggest implementing an alteration to the electronic document that will decrease the energy footprint of the electronic document. Recommendation engine 403 then transmits the reply with recommendations 413 to front end 401.

Subsequent to receiving the reply with recommendations 413, front end 401 modifies the electronic document based on recommendations 413 (step 309). Front end 401 may then transmit a user interface that incorporates the modified electronic document.

In an embodiment, recommendation engine 403 generates electronic document feature vectors 421 based on electronic document characteristics 411. Electronic document feature vectors 421 may comprise a numerical representation of electronic document characteristics 411 and may be used in a machine learning model (e.g., a machine learning model for increasing the energy efficiency of an electronic document, a machine learning model for decreasing an energy footprint of electronic document, etc.). Recommendation engine 403 then transmits electronic document feature vectors 421 to rubric engine 407.

Rubric engine 407 receives electronic document feature vectors 421 and carbon equivalents 423 and produces rubric modification 425. Based on an analysis of electronic document feature vectors 421 in view of carbon equivalents 423, rubric engine 407 may generate rubric modification 425 to update and revise a metric or criterion of rubric 405.

Carbon equivalents 423 may include metrics for energy requirements to render a document, transmit a document, store a document, and the like. A metric for the energy required to render a document may include a measure of the energy consumed by one or more computing systems (e.g., front end systems, network systems, and backend systems) based on the type of feature element of the electronic document (e.g., active links to external content, enabled application features like animations and transitions, etc.). A metric for the energy required to transmit a document may include a measure of energy consumed by computing systems based on the data size of a document. For example, a document having several images, or images that are not compressed, will have a larger data size than a document without images. A metric for energy used to store a document may also include a measure of energy use based on the data size of a document. For example, a document having an embedded video, or video that is not compressed, will have a larger data size than a document without video content.

Figure 5:
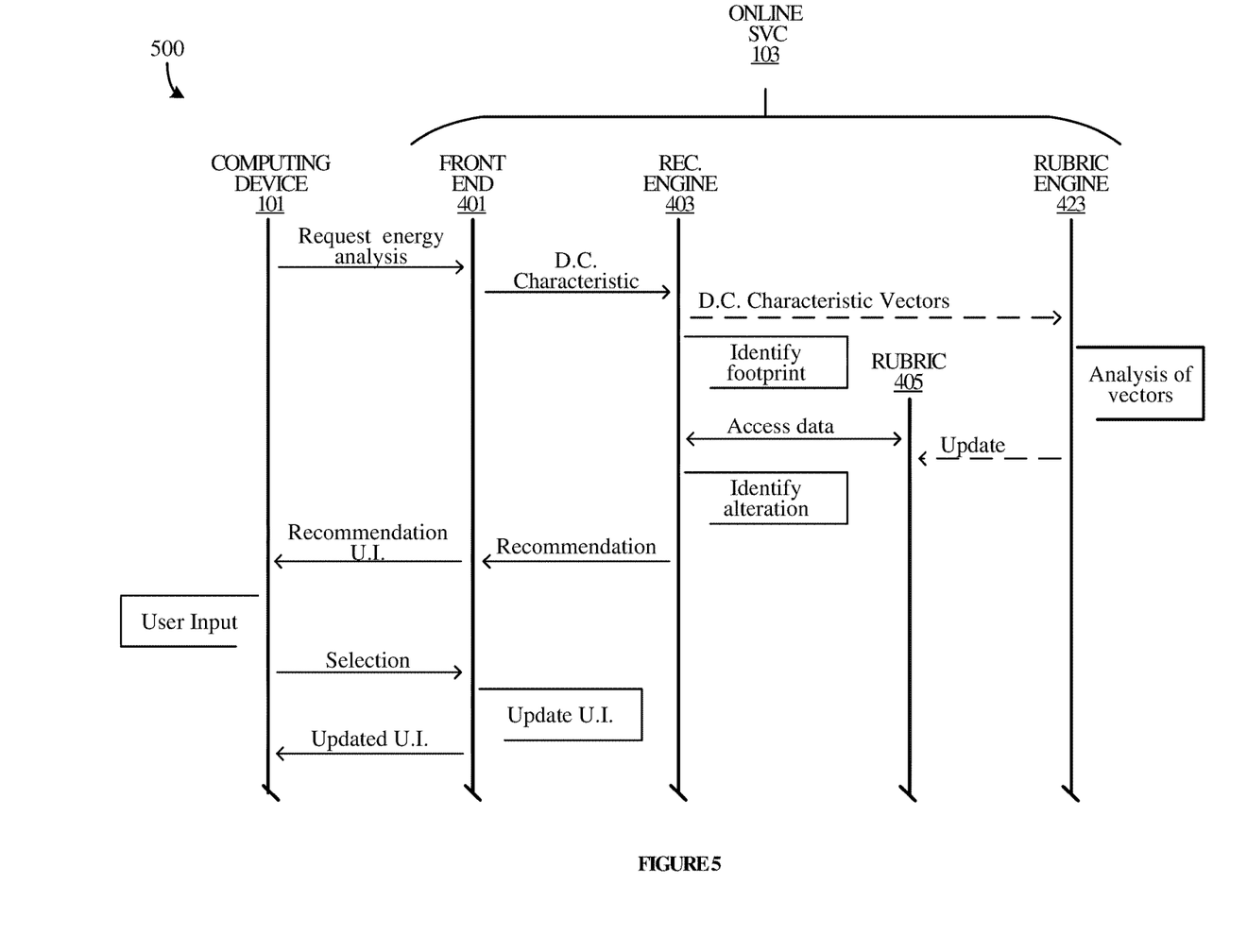
FIG. 5 illustrates an operational scenario in an implementation.

FIG. 5 illustrates a brief operational scenario 500 in an implementation in which computing device 101 sends a request for an energy footprint analysis to online service 103. Online service 103 includes front end 401, recommendation engine 403, rubric 405, and rubric engine 407. Front end 401 receives the request and generates a characteristic of the electronic document to transmit to recommendation engine 403 along with the request.

Recommendation engine 403 receives the request with the electronic document characteristics and generates feature vectors for the electronic document characterized in the request. Recommendation engine 403 then transmits the feature vectors to rubric engine 407, which analyses the feature vectors and generates an update with which to revise rubric 405.

After identifying an energy footprint of the electronic document (e.g., based on the electronic document characteristics), recommendation engine 403 accesses rubric 405 to identify alterations based on the metrics of rubric 405. Recommendation engine 403 may access rubric 405 prior to, or after, updating rubric 405 based on the update generated by rubric engine 407.

Recommendation engine 403 may then generate a reply containing recommendations for reducing the energy footprint of the electronic document by implementing the identified alterations. Recommendation engine 403 may then transmit the reply to front end 401.

Based on the reply, front end 401 may generate a user interface with selectable elements for implementing the identified alterations. Front end 401 may then transmit to computing device 101, the user interface containing the recommendations for surfacing in a user interface to an application of computing device 101.

Computing device 101 may then receive a user input selecting a recommendation and transmit the selection to front end 401. Responsive to the selection, front end 401 generates an updated user interface containing a modification to the electronic document and transmits the updated user interface to computing device 101.

Though not shown, front end 401 may automatically generate an updated user interface responsive to receiving the reply from recommendation engine 403. In this alternative embodiment, the updated user interface may contain a modification to the electronic document and a selectable option for undoing the modification. Front end 401 may automatically generate the updated user interface when an application of computing device 101 is in an energy efficient mode, which includes a mode for implementing an alteration to electronic document responsive to an energy analysis service identifying a modification that would decrease an energy footprint of the electronic document.

Figure 6A:
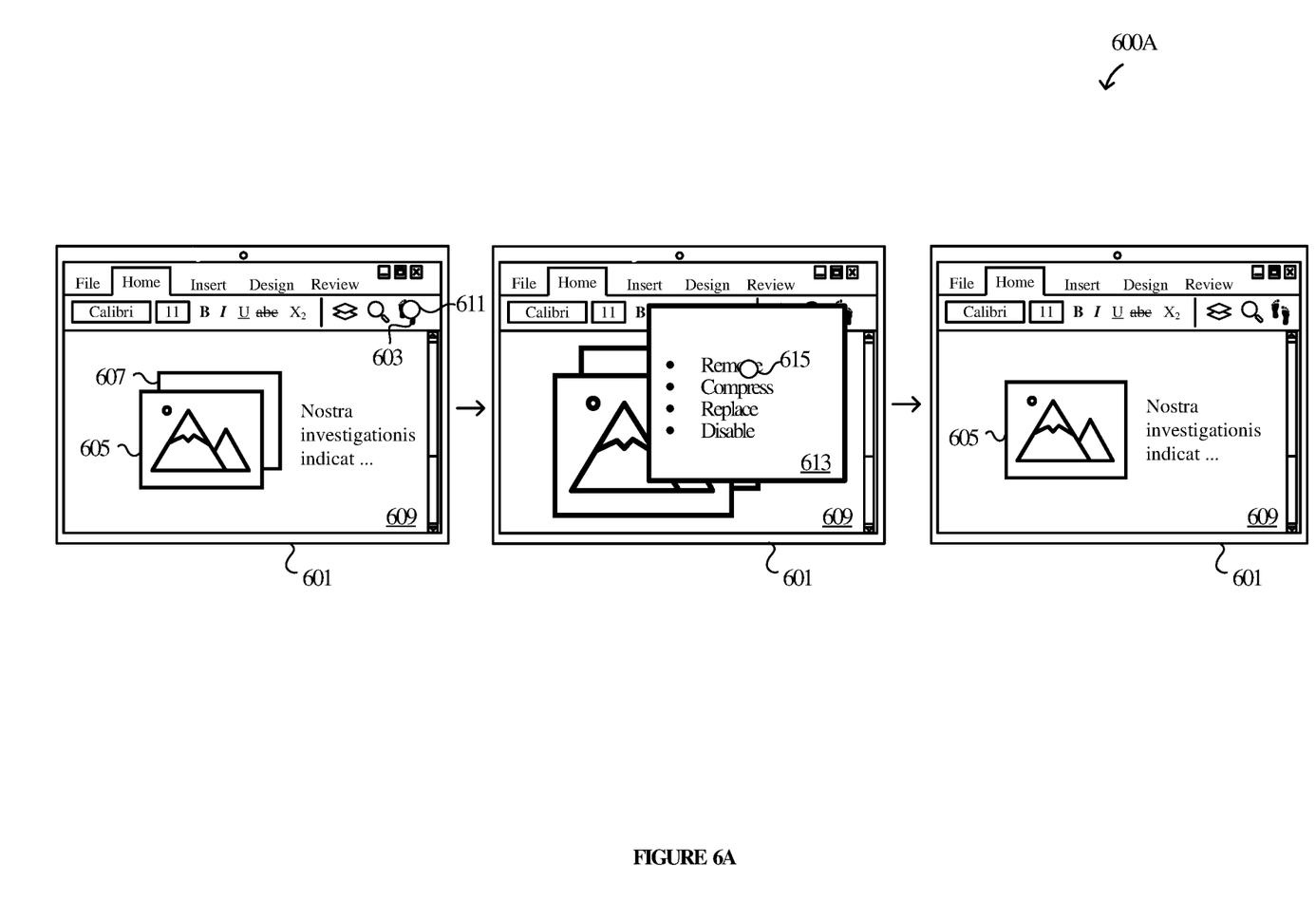
FIG. 6A illustrates a user interface in an implementation.

FIG. 6A illustrates a brief operational scenario 600A in which a computing device (not shown) surfaces user interface 601 containing efficiency icon 603 and electronic document 605 and 607 (e.g., images) of document 609. Electronic document 605 overlays electronic document 607.

Subsequent to receiving user input 611 selecting efficiency icon 603, the computing device surfaces recommendation 613 in user interface 601. Recommendation 613 includes several recommendations (e.g., identified by an energy analysis service). Recommendation 613 may also include an explanation (not shown) that the recommendations are selectable to decrease the energy footprint of document 609. Responsive to user input 615 selecting a recommendation to remove overlayed images, the computing device surfaces user interface 601 with electronic document 605 and without electronic document 607.

Figure 6B:
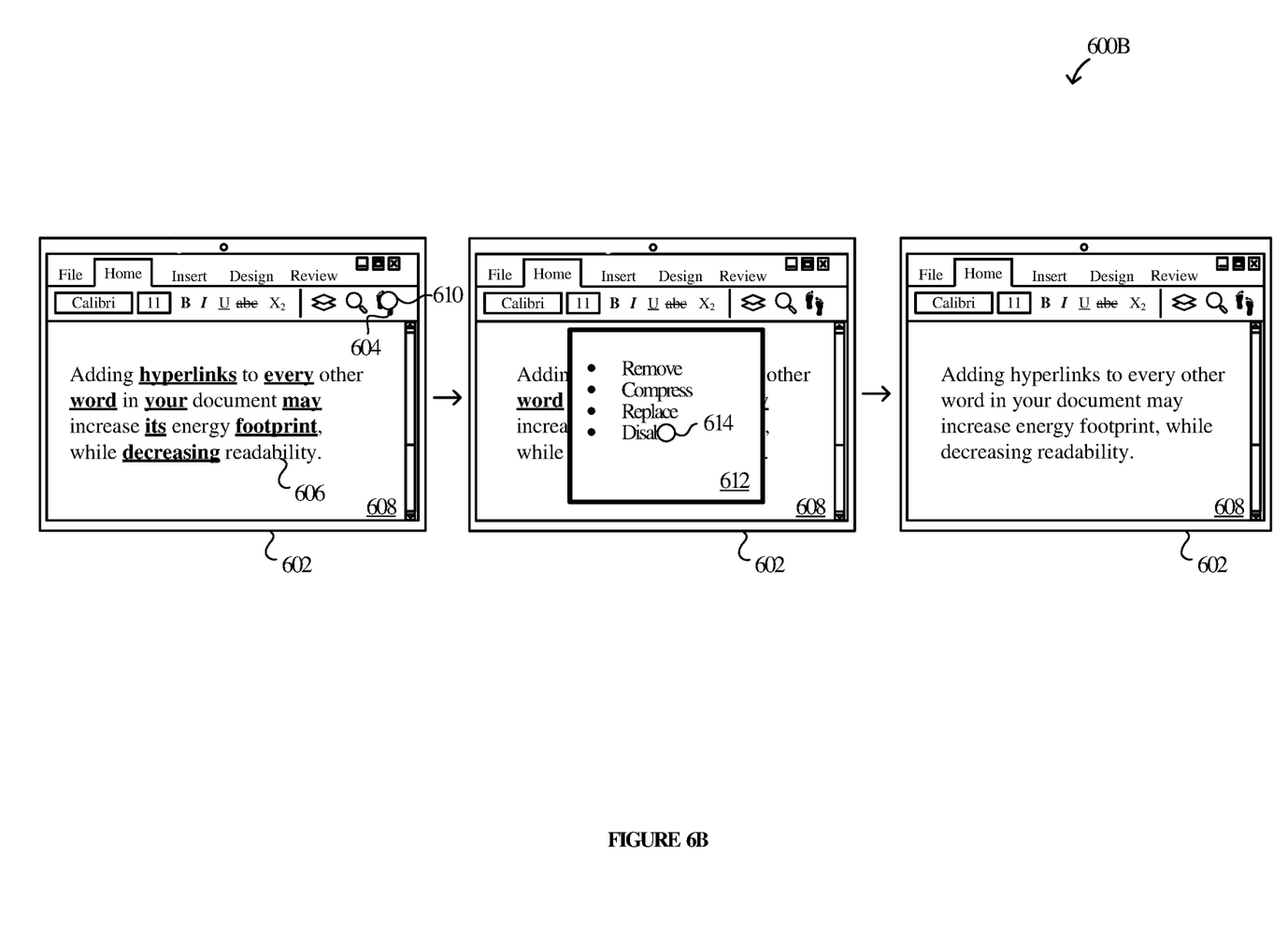
FIG. 6B illustrates a user interface in an implementation.

FIG. 6B illustrates a brief operational scenario 600B in which a computing device (not shown) surfaces user interface 602 containing efficiency icon 604 and electronic document 606 of document 609. Electronic document 606 includes text and multiple, active external links.

Subsequent to receiving user input 610 selecting efficiency icon 604, the computing device surfaces recommendation 614 in user interface 602. Recommendation 614 includes several recommendations (e.g., identified by an energy analysis service). Recommendation 614 may also include an explanation (not shown) that the recommendations are selectable to decrease the energy footprint of document 609. Responsive to user input 610 selecting a recommendation to disable external links, the computing device surfaces user interface 602 with electronic document 606 and without the external links.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, mobile phones, and wearable devices. Examples may also include server computers, web servers, cloud computing platforms, and data center equipment, as well as any other type of physical or virtual server machine, container, and any variation or combination thereof Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements energy efficiency process 706, which is representative of the energy efficiency processes discussed with respect to the preceding Figures, such as energy efficiency process 200 and energy moderation process 300. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including energy efficiency process 706) may be implemented in program instructions and among other functions may, when executed by processing system 702, direct processing system 702 to operate as described with respect to the various operational scenarios, sequences, and processes illustrated herein. For example, software 705 may include program instructions for implementing an energy efficiency process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support energy efficiency and moderation features, functionality, and user experiences. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of energy efficiency applications and services, they apply as well to other contexts such as productivity applications and services, virtual and augmented reality applications and services, business applications and services, and other types of software applications, services, and environments.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
one or more computer readable storage media;
one or more processors operatively coupled with the one or more computer readable storage media; and
program instructions stored on the one or more computer readable storage media that, when executed by the one or more processors, direct the computing apparatus to at least:
display an electronic presentation document in a user interface to an application;
identify characteristics of the electronic presentation document related to an energy footprint of the electronic presentation document, wherein the characteristics include a presence of overlapping content in a slide;
send a request including the characteristics of the electronic presentation document to an energy analysis service to determine the energy footprint of the electronic presentation document;
receive a reply to the request, wherein the reply includes a recommendation to alter to the electronic presentation document to decrease the energy footprint of the electronic presentation document; and
modify the electronic presentation document in accordance with the recommendation.

2. The computing apparatus of claim 1 wherein the program instructions further direct the computing apparatus to:
surface the recommendation in the user interface;
receive user input via the user interface, wherein the user input comprises a selection of the recommendation; and
responsive to the selection of the recommendation, automatically modify the electronic presentation document in accordance with the recommendation.

3. The computing apparatus of claim 1 wherein to modify the electronic presentation document in accordance with the recommendation, the program instructions direct the computing apparatus to automatically modify the electronic presentation document.

4. The computing apparatus of claim 1 wherein the characteristics further include at least one of the following: a presence of embedded video, a presence of a hidden image, a presence of an external link, and an enabled application feature.

5. The computing apparatus of claim 4 wherein the recommendation comprises a suggestion to remove the embedded video.

6. The computing apparatus of claim 4 wherein the recommendation comprises a suggestion to remove the hidden image.

7. The computing apparatus of claim 4 wherein the recommendation comprises a suggestion to deactivate the external link.

8. The computing apparatus of claim 4 wherein the recommendation comprises a suggestion to disable the enabled application feature.

9. The computing apparatus of claim 1 wherein:
the overlapping content comprises overlapping images; and
the recommendation comprises a suggestion to remove an image of the overlapping images.

10. One or more computer readable storage media having program instructions stored thereon that, when executed by one or more processors, direct a computing apparatus to at least:
display an electronic presentation document in a user interface to an application;
identify characteristics of the electronic presentation document related to an energy footprint of the electronic presentation document, wherein the characteristics include a presence of overlapping content in a slide;
send a request including the characteristics of the electronic presentation document to an energy analysis service to determine the energy footprint of the electronic presentation document;
receive a reply to the request, wherein the reply includes a recommendation to alter the electronic presentation document to decrease the energy footprint of the electronic presentation document; and
modify the electronic presentation document in accordance with the recommendation.

11. The one or more computer readable storage media of claim 10 wherein the program instructions further direct the computing apparatus to:
surface the recommendation in the user interface;
receive user input via the user interface, wherein the user input comprises a selection of the recommendation; and
responsive to the selection of the recommendation, automatically modify the electronic presentation document in accordance with the recommendation.

12. The one or more computer readable storage media of claim 10 wherein to modify the electronic presentation document in accordance with the recommendation, the program instructions direct the computing apparatus to automatically modify the electronic presentation document.

13. The one or more computer readable storage media of claim 10 wherein the characteristics further include at least one of the following: a presence of embedded video, a presence of a hidden image, a presence of an external link, and an enabled application feature.

14. The one or more computer readable storage media of claim 13 wherein the recommendation comprises a suggestion to remove the embedded video.

15. The computing apparatus of claim 13 wherein the recommendation comprises a suggestion to deactivate the external link.

16. The computing apparatus of claim 13 wherein the recommendation comprises a suggestion to disable the enabled application feature.

17. The one or more computer readable storage media of claim 10 wherein:
the overlapping content comprises overlapping images; and
the recommendation comprises a suggestion to remove an image of the overlapping images.

18. A method of operating an energy analysis service comprising:
- receiving a request to determine an energy footprint of an electronic presentation document in a user interface to an application, wherein the request includes characteristics of the electronic presentation document related to the energy footprint of the electronic presentation document and the characteristics include a presence of overlapping content in a slide;
- identifying the energy footprint of the electronic presentation document;
- identifying an alteration to the electronic presentation document that decreases the energy footprint of the electronic presentation document; and
- modifying the electronic presentation document in accordance with the alteration.

19. The method of claim 18 further comprising:
- generating a reply to the request, wherein the reply comprises a recommendation to implement the alteration; and
- responsive to a user input comprising a selection of the recommendation, automatically modifying the electronic presentation document in accordance with the alteration.

20. The method of claim 18 wherein identifying the energy footprint of the electronic presentation document comprises analyzing an energy consumption corresponding to the characteristics.

* * * * *